US012571765B2

(12) United States Patent
Chen et al.

(10) Patent No.: US 12,571,765 B2
(45) Date of Patent: Mar. 10, 2026

(54) INTERNAL DETECTION SYSTEM OF STRESS CONCENTRATION OF OIL AND GAS PIPELINE BASED ON UNSATURATED ORTHOGONAL MAGNETIZATION

(71) Applicant: China Special Equipment Inspection & Research Institute, Beijing (CN)

(72) Inventors: Jinzhong Chen, Beijing (CN); Jiaxing Xin, Beijing (CN); Runkun Lu, Beijing (CN); Chang Liu, Beijing (CN); Zhengda Su, Beijing (CN); Qingbao Zhang, Beijing (CN); Guannan Shi, Beijing (CN); Yanbao Guo, Beijing (CN)

(73) Assignee: China Special Equipment Inspection & Research Institute, Beijing (CN)

( * ) Notice: Subject to any disclaimer, the term of this patent is extended or adjusted under 35 U.S.C. 154(b) by 258 days.

(21) Appl. No.: 18/485,657

(22) Filed: Oct. 12, 2023

(65) Prior Publication Data

US 2024/0125737 A1    Apr. 18, 2024

(30) Foreign Application Priority Data

Oct. 13, 2022    (CN) .......................... 202211255769.9

(51) Int. Cl.
*G01N 27/72*    (2006.01)
(52) U.S. Cl.
CPC .................................... *G01N 27/72* (2013.01)
(58) Field of Classification Search
None
See application file for complete search history.

(56) References Cited

U.S. PATENT DOCUMENTS

2001/0017541 A1* 8/2001 Kwun ................ G01N 29/2412
                                                              324/240
2019/0004124 A1* 1/2019 Huang ...................... F17D 5/06

OTHER PUBLICATIONS

Wang Yunan et al. ; Pipeline stress detection probe and method based on magnetostriction inverse effect; Shenyang Academy of Instrumentation Science Co Ltd; Publication•Aug. 28, 2020; CN 111595493 A; (CN) (Year: 2020).*
Decitre Jean-Marc et al.; Electromagnetic Method and Device for Detecting Defects; Commissariat Energie Atomique [FR]; Publication Aug. 9, 2018; WO2018141543A2; (Year: 2018).*

* cited by examiner

*Primary Examiner* — Nasima Monsur
(74) *Attorney, Agent, or Firm* — Millen, White, Zelano & Branigan P.C.; William F. Nixon

(57) ABSTRACT

An internal detection system of stress concentration of an oil and gas pipeline based on unsaturated orthogonally magnetization is provided. The system comprises a detection device and a processing device; the detection device comprises a detection probe; the detection probe comprises a magnetizing device and a magnetic signal acquisition device; the magnetizing device is fixedly connected with the magnetic signal acquisition device; the magnetizing device is configured to magnetize a pipeline to be detected, so that the pipeline generates a magnetized magnetic field; the magnetic signal acquisition device is configured to acquire a magnetic signal of the magnetized magnetic field to obtain an acquired signal and send the acquired signal to the processing device; the processing device is configured to receive the acquired signal and obtain a stress concentration area of the pipeline based on the acquired signal.

9 Claims, 5 Drawing Sheets

INTERNAL DETECTION SYSTEM OF STRESS CONCENTRATION OF OIL AND GAS PIPELINE BASED ON UNSATURATED ORTHOGONAL MAGNETIZATION

CROSS-REFERENCE TO RELATED APPLICATION

This patent disclosure claims the benefit and priority of Chinese Patent Application No. 202211255769.9 filed with the China National Intellectual Property Administration on Oct. 13, 2022, the disclosure of which is incorporated by reference herein in its entirety as part of the present disclosure.

TECHNICAL FIELD CROSS-REFERENCE

The present disclosure relates to the technical field of pipeline detection, in particular to an internal detection system of stress concentration of an oil and gas pipeline based on unsaturated orthogonal magnetization.

BACKGROUND

It is easy for stress concentration to change the mechanical properties of an oil and gas pipeline, eventually leading to the decline of corrosion resistance, the enhancement of fatigue strength and the reduction of fatigue life of the oil and gas pipeline. Therefore, accurate detection of stress concentration of a pipeline is an important means to prevent pipeline failure.

In the prior art, a metal magnetic memory method is mostly used to detect the stress concentration of a pipeline. The metal magnetic memory method uses the influence of a geomagnetic field on a magnetic domain inside the pipeline. The area where the pipeline generates stress concentration will produce an inverse magnetostrictive effect, which will lead to the change of a magnetic field, and the magnetic effect resulted from this stress change will remain inside the detected pipeline. By detecting this change, the internal stress of the pipeline can be obtained. However, because the magnetic field intensity of the geomagnetic field is very low, the magnetic field inside the pipeline is easily disturbed, which leads to the instability of the obtained magnetic signal so that the final detection result is inaccurate.

SUMMARY

Aiming at the problems in the prior art, the present disclosure provides an internal detection system of stress concentration of an oil and gas pipeline based on unsaturated orthogonally magnetization, which can detect the stress concentration area of the pipeline more accurately.

In order to achieve the above purpose, the technical scheme of the present disclosure is realized as follows.

The embodiment of the present disclosure provides an internal detection system of stress concentration of an oil and gas pipeline based on unsaturated orthogonally magnetization, where the system includes: a detection device and a processing device; the detection device includes a detection probe; the detection probe includes a magnetizing device and a magnetic signal acquisition device; the magnetizing device is fixedly connected with the magnetic signal acquisition device; the magnetizing device is configured to magnetize a pipeline to be detected, so that the pipeline generates a magnetized magnetic field; the magnetic signal acquisition device is configured to acquire a magnetic signal of the magnetized magnetic field to obtain an acquired signal and send the acquired signal to the processing device; the processing device is configured to receive the acquired signal and obtain a stress concentration area of the pipeline based on the acquired signal.

In some embodiments, the magnetizing device includes an excitation coil and two U-shaped magnetic cores fixed orthogonally to each other; the excitation coil is uniformly wound on each of the magnetic cores; end faces of core legs of the two magnetic cores are located on a same plane, the core legs of the two magnetic cores are arranged in a ring to form a concave part; and the magnetic signal acquisition device is fixedly provided at the concave part.

In some embodiments, magnetization of the pipeline which is carried out by the magnetizing device is unsaturated magnetization; and an absolute value of a difference between an intensity of the unsaturated magnetization of the pipeline upon being magnetized by the magnetizing device and an intensity of the saturated magnetization of the pipeline is less than a predetermined threshold.

In some embodiments, the magnetic signal acquisition device is a magnetoresistive sensor; the magnetoresistive sensor includes a detection chip for acquiring the magnetic signal; and the detection chip is flush with the end faces of the core legs of the two magnetic cores.

In some embodiments, the detection probe further includes: a shell matched with the core legs of the two magnetic cores; and the core legs of the two magnetic cores are fixedly provided in the shell.

In some embodiments, there are a plurality of detection probes; the detection device further includes a cylindrical probe carrier; the plurality of detection probes are fixedly provided on an outer surface of the probe carrier in an annular array arrangement mode; when the detection device is placed in the pipeline, an end face of each detection probes with the detection chip is closely attached to an inner wall of the pipeline.

In some embodiments, the detection device further includes: backing plates with a same number as the detection probes; the backing plates are fixedly provided on an outer surface of the probe carrier in an annular array arrangement mode; and each of the detection probes is fixedly provided on a backing plate corresponding to the detection probe through a spring.

In some embodiments, the detection device further includes a wheel and an axle system; and the wheel and axle system is configured to drive the probe carrier to move axially in the pipeline.

In some embodiments, the processing device includes: a signal preprocessing module, a data operation module and a storage module; the signal preprocessing module, the data operation module and the storage module are electrically connected in sequence; the signal preprocessing module is configured to filter and amplify the acquired signal to obtain a preprocessed signal; the data operation module is configured to calculate the stress concentration area of the pipeline based on the preprocessed signal; and the storage module is configured to store the stress concentration area of the pipeline as a processing result.

In some embodiments, the system further includes: a preset terminal; and the processing device is further configured to obtain a stress magnitude of the stress concentration area of the pipeline based on the acquired signal, and send the stress concentration area and the stress magnitude to the preset terminal as the processing result.

The internal detection system of stress concentration of an oil and gas pipeline based on the unsaturated orthogonally magnetization provided by the embodiment of the present disclosure is provided with a magnetizing device and a magnetic signal acquisition device which are fixedly connected with each other, where the magnetizing device is configured to magnetize the pipeline to be detected, so that the pipeline generates a magnetized magnetic field; the magnetic signal acquisition device is configured to acquire a magnetic signal of the magnetized magnetic field to obtain an acquired signal and send the acquired signal to the processing device; the processing device is configured to obtain a stress concentration area of the pipeline based on the acquired signal. That is, in the embodiment of the present disclosure, the pipeline generates a magnetized magnetic field through an external magnetizing device, so that the magnetic signal acquisition device can obtain a stable and effective magnetic signal, and the problem of unstable magnetic signals resulted from the existing metal magnetic memory method can be avoided. In addition, the magnetizing device and the magnetic signal acquisition device in the embodiment of the present disclosure are fixedly connected with each other, so that magnetic signals of the pipeline can be acquired through the magnetic signal acquisition device while the pipeline is magnetized by the magnetizing device, and the acquired magnetic signals are more timely, accurate and effective. It can be seen that the technical scheme provided by the embodiment of the present disclosure can detect the stress concentration area of the pipeline more accurately.

BRIEF DESCRIPTION OF THE DRAWINGS

The scope of the present disclosure can be better understood by reading the following detailed description of exemplary embodiments in conjunction with the accompanying drawings. The attached drawings are as follows.

DESCRIPTION OF REFERENCE NUMERALS

1—excitation coil, 2—magnetic core, 3—magnetic signal acquisition device, 4—shell, 5—probe carrier, 6—backing plate, 7—spring, 8—roller, 9—axle, 10—perforated plate

DETAILED DESCRIPTION OF THE EMBODIMENTS

In order to make the purpose, technical scheme and advantages of the present disclosure more clear, the implementation method of the present disclosure will be described in detail with reference to the attached drawings and embodiments hereinafter, so as to fully understand and implement the implementation process of how to apply technical means in the present disclosure to solve technical problems and achieve technical effects.

In the following description, many specific details are set forth in order to fully understand the present disclosure. However, the present disclosure can be implemented in other ways than those described here. Therefore, the protection scope of the present disclosure is not limited by the specific embodiments disclosed hereinafter.

Some embodiments of the present disclosure aims to overcome the shortcomings of the prior art and provide an internal detection system of stress concentration of an oil and gas pipeline based on unsaturated orthogonal magnetization. Based on the principle of electromagnetic induction, when direct current passes through the excitation coil, the orthogonal magnetization-based stress concentration detection probe magnetizes the oil and gas pipeline, and the inner surface of the pipeline will generate a corresponding magnetic field. If there is a stress concentration area in the pipeline, the magnetic domain distribution in the oil and gas pipeline will change, thus resulting in the change of the magnetic field on the inner surface of the pipeline. Then, the magnetic field information is acquired and analyzed by the magnetoresistive sensor, so as to obtain the parameters such as the dimension and size of the stress concentration on the inner surface of the pipeline. The detection device of the present disclosure operates in the pipeline when working. The roller contacts with the inner surface of the pipeline. The orthogonal magnetization-based stress concentration detection probe can bounce up and down under the action of the spring, thus avoiding the loose contact between the detection probe and the inner wall of the pipeline, and further improving the precision of detecting the pipeline stress concentration. After that, the signal of stress concentration of the oil and gas pipeline is filtered, amplified, acquired and analyzed by an electronic detection system. The present disclosure has the advantages of simple structure, convenient operation, high detection precision, long service life and wide application range.

Figure 1:
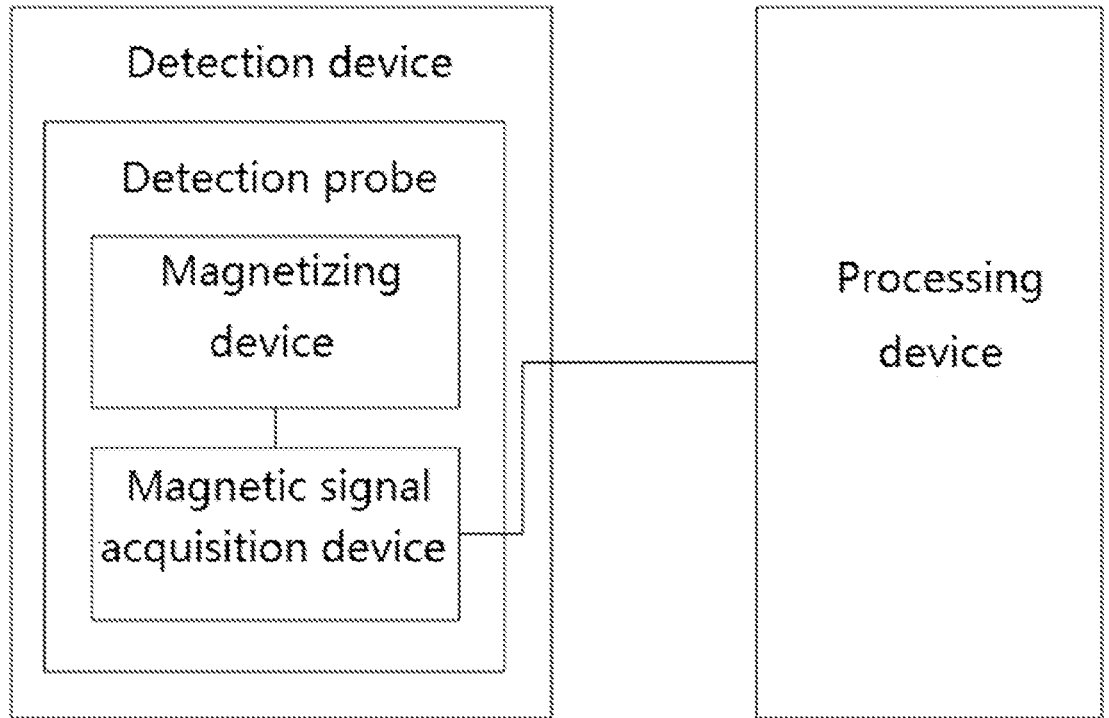
FIG. 1 is a schematic diagram of a system structure according to an embodiment of the present disclosure.

In order to achieve the above purpose, an embodiment of the present disclosure provides an internal detection system of stress concentration of an oil and gas pipeline based on unsaturated orthogonal magnetization. As shown in FIG. 1, the system in this embodiment comprises: a detection device and a processing device. The detection device comprises a detection probe, and the detection probe comprises a magnetizing device and a magnetic signal acquisition device. The magnetizing device is fixedly connected with the magnetic signal acquisition device, and the magnetizing device is configured to magnetize a pipeline to be detected, so that the pipeline generates a magnetized magnetic field. The magnetic signal acquisition device is configured to acquire a magnetic signal of the magnetized magnetic field to obtain an acquired signal and send the acquired signal to the processing device, and the processing device is configured to receive the acquired signal and obtain a stress concentration area of the pipeline to be detected based on the acquired signal.

Figure 2:
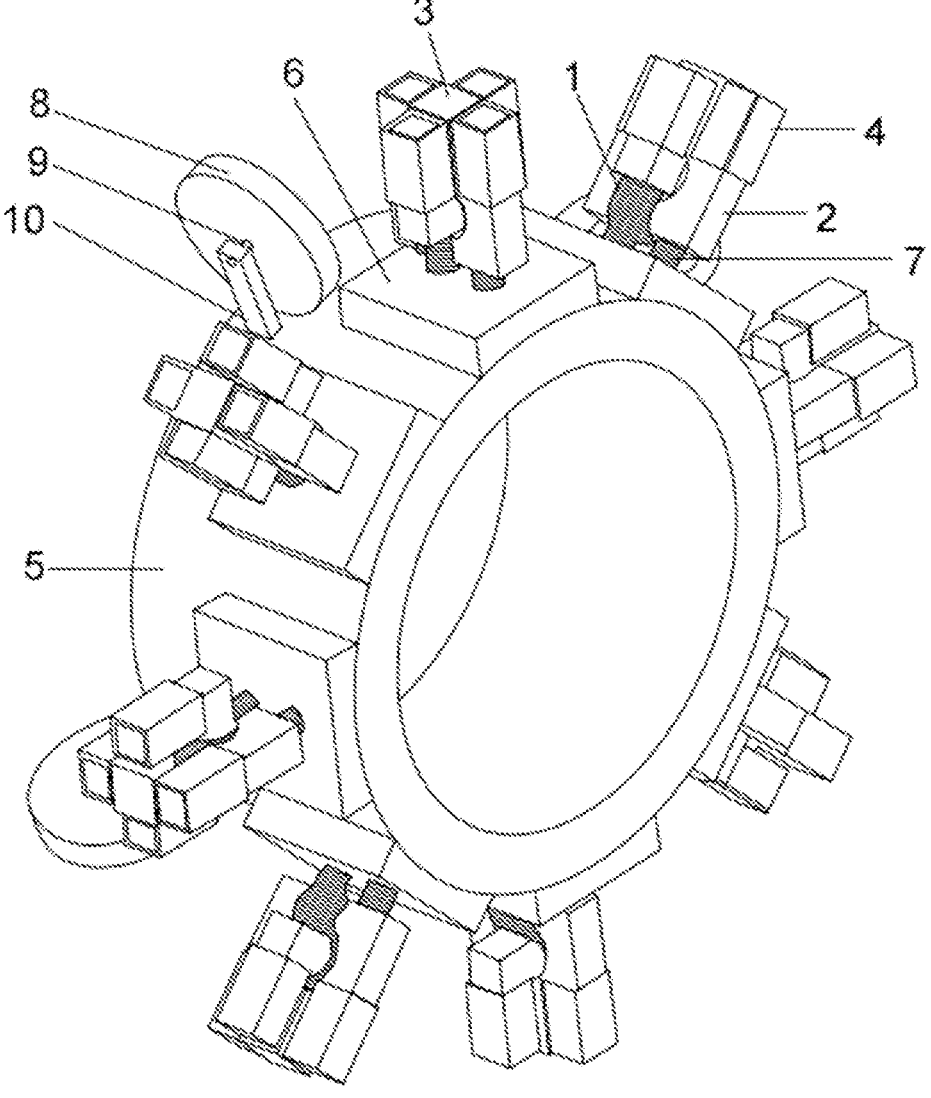
FIG. 2 is a schematic diagram of a mechanical structure of a detection device according to an embodiment of the present disclosure.
Figure 3:
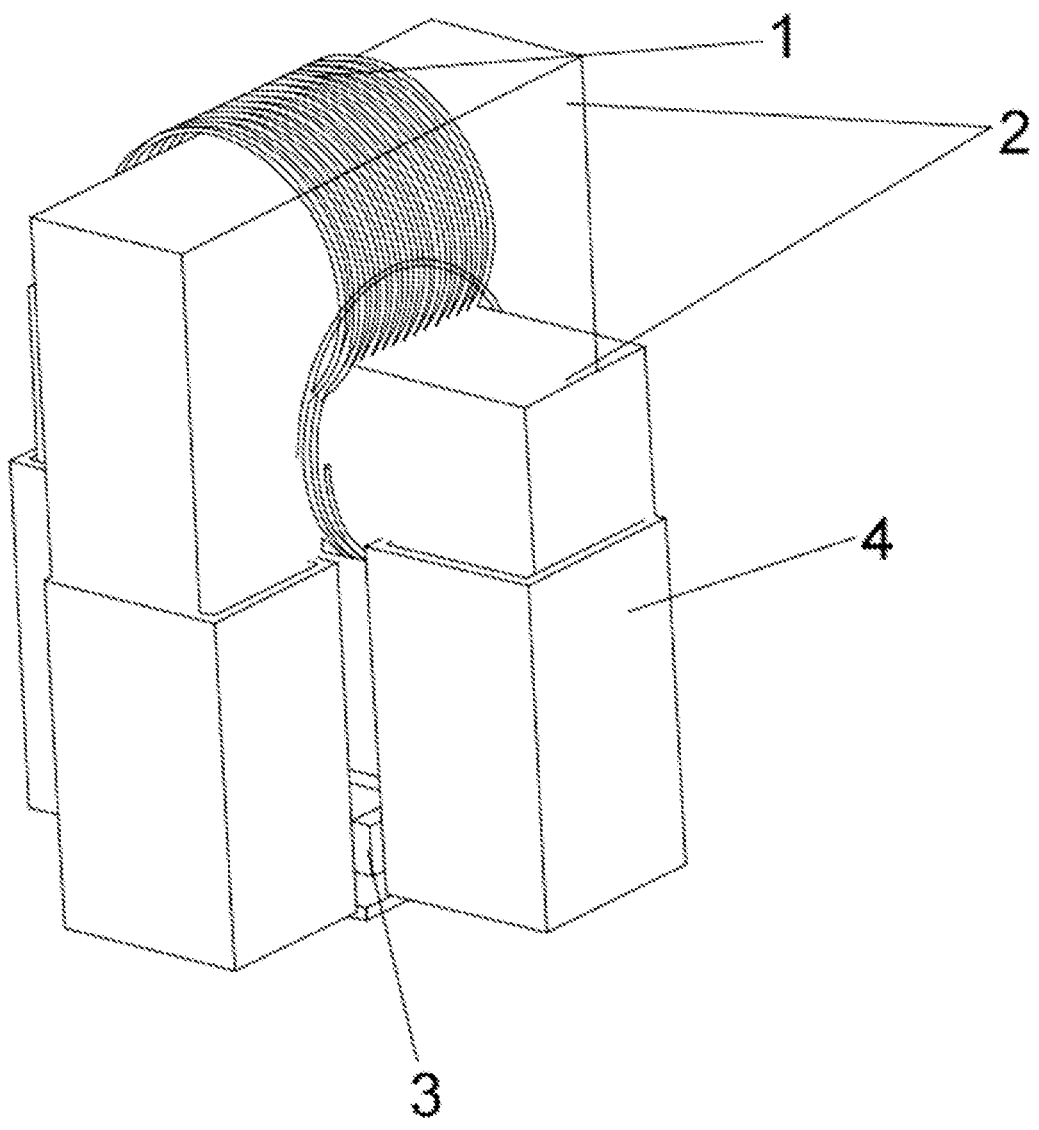
FIG. 3 is a schematic diagram of a mechanical structure of a detection probe according to an embodiment of the present disclosure.

In order to effectively orthogonally magnetize the pipeline to be detected, in this embodiment, as shown in FIGS. 2 and 3, the magnetizing device comprises an excitation coil 1 and two U-shaped magnetic cores 2 fixed orthogonally to each other. The excitation coil 1 is uniformly wound on each of the magnetic cores 2, and end faces of core legs of the two magnetic cores 2 are located on the same plane, the core legs of the two magnetic cores 2 are arranged in a ring to form a concave part; and the magnetic signal acquisition device 3 is fixedly provided at the concave part.

In order to detect the stress concentration area of the pipeline to be detected more accurately, in this embodiment, magnetization of the pipeline which is carried out by the magnetizing device is unsaturated magnetization. And, an absolute value of a difference between an intensity of the unsaturated magnetization of the pipeline to be detected upon being magnetized by the magnetizing device and an intensity of the saturated magnetization of the pipeline is less than a preset threshold.

The selection of an intensity of a magnetization of the pipeline is the most important step in the internal detection technology of stress concentration of an oil and gas pipeline based on the unsaturated orthogonally magnetization. The magnitude of the intensity of the magnetization directly affects the characteristics of stress concentration signals and the structure of the detection device, and plays a decisive role in the reliability and accuracy of detection in the stress concentration area of the pipeline through the stress detection technology based on the unsaturated orthogonal magnetization. When the pipeline is magnetized by the detection probe, greater magnetization means greater ampere turns, a larger and heavier magnetic leakage device, a lower spatial resolution, a greater heat energy generated by the coil, and so on. In addition, the high magnetic field will produce the indication of surface roughness in the form of noise, thus reducing the sensitivity of detection. In addition, high-intensity magnetization may lead to a residual magnetic field, which must be removed by post-inspection demagnetization. Therefore, it is necessary to explore a low-magnetization magnetic flux detection method to detect stress concentration in the pipeline. Therefore, the magnetization is selected in the near-saturation region of the pipeline, so as to ensure that the stress detection of the pipeline has sufficient detection precision.

In order to acquire the magnetic signal more accurately and effectively, the magnetic signal acquisition device 3 in this embodiment is a magnetoresistive sensor; the magnetoresistive sensor comprises a detection chip for acquiring the magnetic signal; and the detection chip is flush with the end faces of the core legs of the two magnetic cores 2.

As shown in FIG. 2 and FIG. 3, in this embodiment, the detection probe further comprises: a shell 4 matched with the core legs of the two magnetic cores 2; and the core legs of the two magnetic cores 2 are fixedly provided in the shell 4. The shell 4 can effectively protect the detection probe and prevent the detection probe from being damaged by friction or collision with the inner wall of the pipeline.

In order to improve the detection efficiency and avoid the omission of magnetic signal detection in the pipeline, in this embodiment, as shown in FIG. 2, there are a plurality of detection probes. The detection device in this embodiment further comprises a cylindrical probe carrier 5; the plurality of detection probes are fixedly provided on an outer surface of the probe carrier 5 in an annular array arrangement mode. When the detection device is placed in the pipeline to be detected, the end face of each of the detection probes with the detection chip is closely attached to an inner wall of the pipeline to be detected.

As shown in FIG. 2, in this embodiment, the detection device further comprises backing plates 6 with the same number as the detection probes, the backing plates 6 are fixedly provided on an outer surface of the probe carrier 5 in an annular array arrangement mode, and each of the detection probes is fixedly provided on a backing plate 6 corresponding to the detection probe through a spring 7. The spring 7 makes the detection probe more closely attached to the inner wall of the pipeline, and the backing plate 6 is configured to mount the spring to more effectively fix the detection probe on the probe carrier 5.

In order to make the detection device automatically move in the pipeline to detect the magnetic signals of all parts in the pipeline, the detection device in this embodiment further comprises a wheel and axle system; and the wheel and axle system is configured to drive the probe carrier 5 to move axially in the pipeline.

As shown in FIG. 2, the wheel and axle system in this embodiment comprises: a roller 8, an axle 9, a perforated plate 10 and an engine. A plurality of groups of perforated plates 10 are fixed on the outer surface of the probe carrier 5 in an annular array arrangement mode, and the roller 8 is connected with a group of perforated plates 10 through the axle 9. The engine drives the axle 9 to move, thereby driving the roller 8 to move, so that the whole detection device can move freely.

The number of groups of perforated plates 10 can be set according to actual needs. For example, there are four groups of perforated plates 10. Correspondingly, there are four rollers 8 and four axles 9. Of course, other numbers can also be set, which is not specifically limited in the embodiment.

Specifically, 8 detection probes are used in this embodiment, and the 8 detection probes are fixed on the outer surface of the probe carrier 5 in an annular array arrangement mode. The whole detection device is designed according to the size of the pipeline with a diameter of 325 mm. This device can make each detection probe closely attached to the inner wall of the oil and gas pipeline, and can realize free movement in the axial direction of the oil and gas pipeline. The probe carrier 5 is a cylinder with a diameter of 200 mm and a wall thickness of 20 mm, and is provided with four groups of perforated plates 10 connecting the axles. The perforated plate 10 on the probe carrier 5 has a size of 35 mm×5 mm and a thickness of 10 mm, and the diameter of the hole on the perforated plate 10 is 3 mm. The axle 9 is a cylinder with a diameter of 3 mm and a length of 30 mm, and plays a role in connecting the roller 8 with a plurality of groups of perforated plates 10. The roller 8 has an outer diameter of 60 mm, an inner diameter of 3 mm and a thickness of 10 mm, so that the whole detection device can realize the axial movement inside the oil and gas pipeline. The backing plate 6 is fixed on the probe carrier 5. The thickness of the backing plate 6 is 60 mm. the upper part of the backing plate 6 is provided with two circular grooves in which the springs 7 are placed. The detection probe is fixed on the springs 7, so that the detection probe can be closely attached to the inner wall of the oil and gas pipeline.

The detection probe comprises: an excitation coil 1, a magnetic core 2, a magnetic signal acquisition device 3 (a magnetoresistive sensor) and a shell 4. The magnetic core 2 is U-shaped and made of silicon steel. The silicon steel is suitable for low frequency not exceeding 400 Hz. The silicon steel sheet has a low price and a high magnetic saturation intensity. The excitation coil 1 is wound on the magnetic core 2, and the two magnetic cores 2 are placed orthogonally to generate orthogonal excitation to the pipeline. The magnetoresistive sensor is fixed by gluing or welding in the concave part formed by arranging the core legs of the two magnetic cores 2 in a ring. The size of the concave part is accurately designed according to the position of the detection chip of the magnetoresistive sensor, so as to ensure that the detection chip is located in the right center position of the four magnetic core legs. The magnetoresistive sensor uses a TMR2503 linear sensor, and is designed by a unique push-pull Wheatstone full-bridge structure, including four unshielded high-sensitivity Tunnel Magneto Resistance (TMR) sensor elements which can sense the magnetic field perpendicular to the surface of the detection chip. The Wheatstone full-bridge provides differential voltage output when the external magnetic field changes in the direction perpendicular to the surface of the detection chip. In the range of −55° C. to +150° C., the sensitivity and the offset voltage of TMR2503 can be kept at a stable level. TMR2503 has an excellent performance and uses three packaging forms: TO94, SSIP4 and SOT23-5. The packaging form used in this embodiment is SSIP4.

In order to effectively process the magnetic signal, in this embodiment, the processing device comprises: a signal preprocessing module, a data operation module and a storage module. The signal preprocessing module, the data operation module and the storage module are electrically connected in sequence, the signal preprocessing module is configured to filter and amplify the acquired signal received to obtain a preprocessed signal; the data operation module is configured to calculate and obtain the stress concentration area of the pipeline based on the preprocessed signal; and the storage module is configured to store the stress concentration area of the pipeline as a processing result.

In order to conveniently obtain the processing result of the processing device, the system in this embodiment further comprises a preset terminal; and the processing device is further configured to obtain a stress magnitude of the stress concentration area of the pipeline based on the acquired signal, and send the stress concentration area and the stress magnitude to the preset terminal as the processing result.

Figure 4:
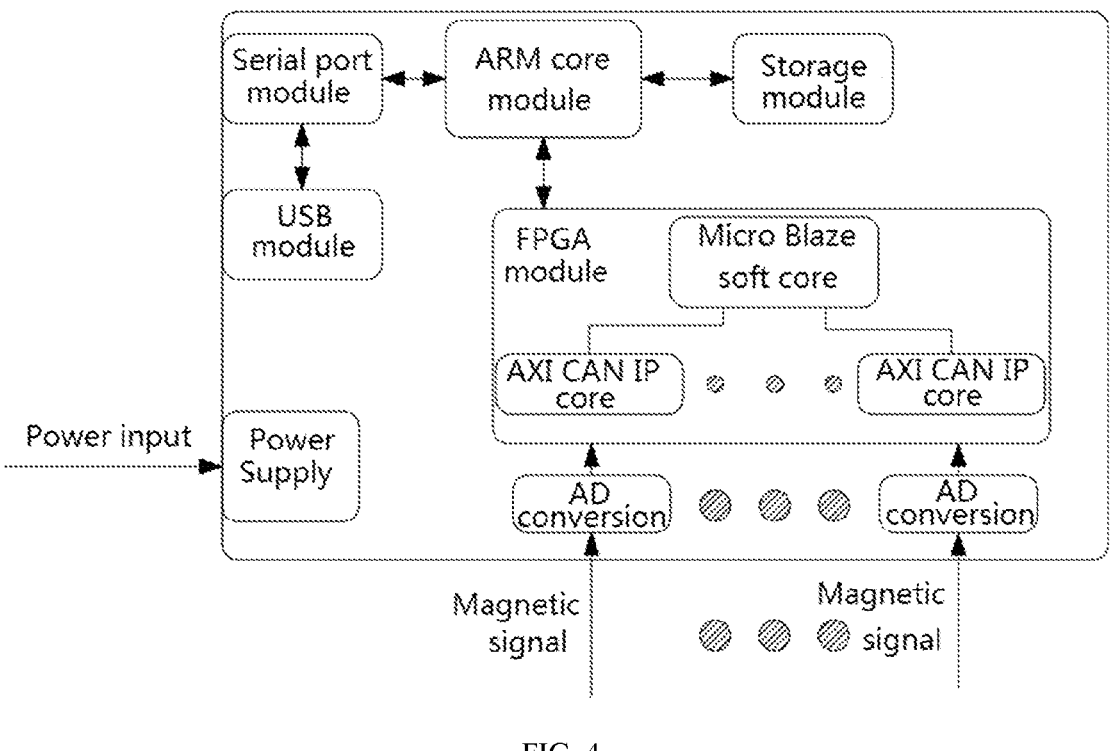
FIG. 4 is a schematic diagram of a structure of a processing device according to an embodiment of the present disclosure.
Figure 5:
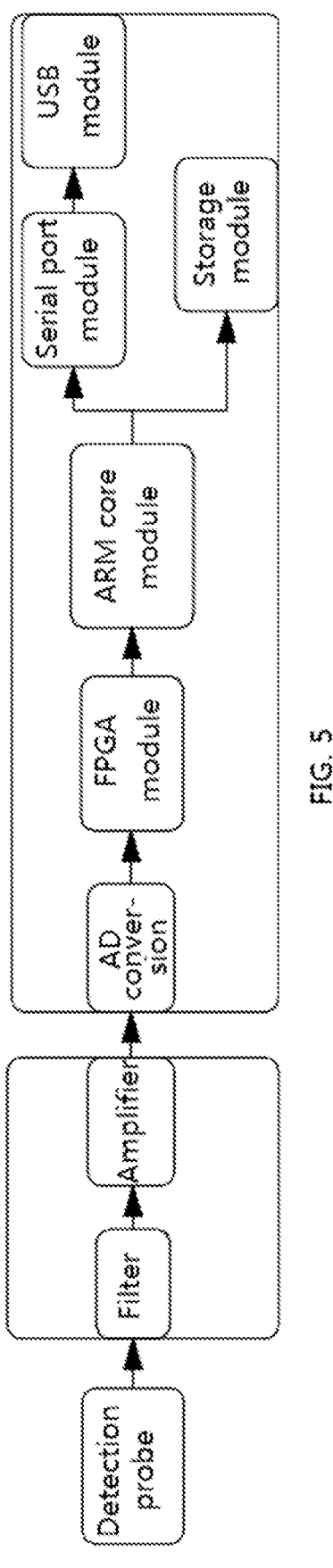
FIG. 5 is a schematic diagram of an another structure of a processing device according to an embodiment of the present disclosure.

Specifically, as shown in FIGS. 4 and 5, the processing device in this embodiment comprises: a low-pass filter, a signal amplifier, a data acquisition card, an Analog to Digital (AD) conversion module, an Field Programmable Gate Array (FPGA) module, an Advanced Reduced Instruction Set Computer (RISC) Machine (ARM) core module, a serial port module, a Universal Serial Bus (USB) module and a storage module. The low-pass filter is connected in series with the signal amplifier, and the signal amplifier is connected in series with the data acquisition card. The low-pass filter and the signal amplifier form the signal preprocessing module.

The low-pass filter in this embodiment uses a Direct-current inductor (DC-L) power filter module, which is a low-pass filter module designed by combining an inductor and a capacitor. At present, the output current of the power filter is less than 5 A. The output current of the signal filter is less than 200 mA, and the maximum withstand voltage is 35 V, which is suitable for the occasions where the direct current signals are disturbed. The low-pass filter is produced and designed according to military standards, and is designed with a connecting terminal interface. Each component is imported, which has a small volume and a good filtering effect.

The signal amplifier in this embodiment uses an AD623 instrumentation amplifier module. The module is a low-cost, high-precision instrumentation amplifier, which only needs an external resistor to set the gain. The gain has a range from 1 to 1000, which is very suitable for battery power supply and portable (or remote) applications. The AD623 has the characteristics of high precision, low offset voltage and low offset drift, which is an ideal choice for precision data acquisition systems such as sensor interfaces. The signal amplifier also has the characteristics of low noise, low input bias current and low power, which is very suitable for precise data acquisition. The module is powered by a positive and negative power supply. By default, an analog potentiometer is used to adjust the gain, and can be switched to a program-controlled digital potentiometer through a wire jumper to adjust the gain. Users can choose according to their own needs.

The ARM core module in this embodiment comprises an ARM controller based on a Cortex-A8 kernel, 512 MByte (MB) DDR3 Random Access Memory (RAM), 2 Gigabyte (GB) ROM, power management and various Input/output (IO) interfaces. The main functions that the ARM core module is responsible for include: communicating with the personal computer (PC) through a USB module, being used for self-checking the device before the internal detection system of stress concentration of an oil and gas pipeline based on the unsaturated orthogonally magnetization enters the pipeline to be detected for formal detection, and judging whether the magnetoresistive sensors used for detecting all magnetic signals are normal; obtaining the magnetic data acquired and preprocessed by the FPGA module; storing all data obtained from the FPGA in a storage medium; and storing the state record of the internal detection system of stress concentration of an oil and gas pipeline based on the unsaturated orthogonally magnetization during operation.

The FPGA module in this embodiment comprises a MicroBlaze soft core and a plurality of AXI CAN IP cores. The FPGA unit is connected with the external CAN bus. The MicroBlaze soft core and the AXI CAN IP cores can be operated. The Controller Area Network (CAN) bus data transmitted from the external CAN bus can be acquired into the memory in the FPGA unit. The number of the AXI CAN IP cores can be configured according to the number of channels of the CAN bus data. For example, when the data acquisition device is configured to acquire 16 pieces of CAN bus data, the number of the AXI CAN IP cores can be configured as 16. When the magnetic data is acquired, the FPGA module sends gating address signals to all signal routing devices, and each signal routing device is correspondingly connected with a plurality of magnetoresistive sensors and can gate the plurality of connected magnetoresistive sensors. The signal routing device gates the corresponding magnetic signal channel according to the received gating address signal, so as to transmit the magnetic signal detected by the magnetoresistive sensor corresponding to the magnetic signal channel to an AD conversion device, and complete a magnetic data acquisition under the control of the FPGA.

The AD conversion module in this embodiment includes a plurality of AD conversion devices, which are respectively used for analog-to-digital conversion of all magnetic signals. The number of the AD conversion devices is larger than the number of the signal routing devices, and is equal to the sum of the number of the signal routing devices and the number of the analog switches. In this embodiment, the plurality of signal routing devices are respectively and correspondingly connected to a plurality of different AD conversion devices. Each signal routing device is connected to a plurality of magnetoresistive sensors to form a plurality of different magnetic signal channels between the AD conversion devices and the signal routing devices and between the signal routing devices and the magnetoresistive sensors.

The storage module in this embodiment is connected with the ARM core module and is configured to store the processing result of the CAN bus data in the FPGA module.

The serial port module in this embodiment is connected with the ARM core module and is configured to transmit the processing result of the CAN bus data in the FPGA module. The USB module is configured to convey the data transmitted by the serial port module to the PC for signal processing.

The data acquisition device in this embodiment uses the data acquisition card USB 6211. The data acquisition card is a bus-powered M-series multi-functional data acquisition (DAQ) module, and can provide high accuracy even at a high sampling rate after optimization. The module provides 16 analog inputs, 250 kS/s single-channel sampling rate, 2 analog outputs, 4 digital input lines and 4 digital output lines. Each channel has four programmable input ranges (±200 mV to ±10 V), analog and digital triggers, and two counters/timers. The USB-6211OEM (Original Equipment Manufacturer) also has a universal 50-pin connector, which can be easily integrated with the design of the user. The device is an ideal choice for testing, controlling and designing applications, including portable data recording, on-site monitoring, embedded OEM, vehicle data acquisition and college applications.

The internal detection system of stress concentration of an oil and gas pipeline based on the unsaturated orthogonally magnetization in this embodiment detects and stores the magnetic signal detected by the detection probe to obtain the magnetic data. After the pipeline detection, the stored magnetic data can be exported to the PC for analysis and processing, so as to judge the health status of the whole pipeline.

The technical principle of this embodiment is as follows. After the oil and gas pipeline is magnetized, a complete magnetic loop is formed between the magnetic core and the pipeline. However, when the pipeline generates stress concentration, the magnetic field inside the pipeline will change because the arrangement and the direction of the magnetic moment of the magnetic domain structure of ferromagnetic material change, the magnetic line of force is no longer parallel to the inner surface of the pipeline, so that the magnetic line of force fluctuates in the stress concentration area. The magnetic field signals are picked up by the magnetoresistive sensor, and then the pipeline stress concentration signals are filtered, amplified, acquired and analyzed by the electronic system of an oil and gas pipeline based on the unsaturated orthogonally magnetization, so as to realize the location and quantification of the stress concentration area of the pipeline.

The internal detection system of stress concentration of an oil and gas pipeline based on the unsaturated orthogonally magnetization provided by the embodiment of the present disclosure is provided with a magnetizing device and a magnetic signal acquisition device which are fixedly connected with each other, where the magnetizing device is configured to magnetize the pipeline to be detected, so that the pipeline generates a magnetized magnetic field; the magnetic signal acquisition device is configured to acquire a magnetic signal of the magnetized magnetic field to obtain an acquired signal and send the acquired signal to the processing device; the processing device is configured to obtain a stress concentration area of the pipeline based on the acquired signal. That is, in the embodiment of the present disclosure, the pipeline generates a magnetized magnetic field through an external magnetizing device, so that the magnetic signal acquisition device can obtain a stable and effective magnetic signal, and the problem of unstable magnetic signals resulted from the existing metal magnetic memory method can be avoided. In addition, the magnetizing device and the magnetic signal acquisition device in the embodiment of the present disclosure are fixedly connected with each other, so that magnetic signals of the pipeline can be acquired through the magnetic signal acquisition device while the pipeline is magnetized by the magnetizing device, and the acquired magnetic signals are more timely, accurate and effective. It can be seen that the technical scheme provided by the embodiment of the present disclosure can detect the stress concentration area of the pipeline more accurately.

The present disclosure provides an internal detection system of stress concentration of an oil and gas pipeline based on unsaturated orthogonally magnetization, which solves the technical problems of a weak magnetic signal and an unstable signal of a pipeline stress detection controller in related technologies, and further improves the reliability of engineering application of the pipeline stress detection controller.

The present disclosure also has the following advantages.

1. The detection device designed by the present disclosure can realize the axial movement along the oil and gas pipeline in the oil and gas pipeline, which makes the operation of the user simple and improves the detection efficiency.

2. According to the present disclosure, the backing plate and the spring are designed on the outer surface of the probe carrier, so that the detection probe can be closely attached to the inner wall of the oil and gas pipeline, and the accuracy of the present disclosure can be greatly improved.

3. By changing the size of the detection device, the present disclosure can be applied to pipelines with various sizes, thus greatly improving the applicability of the present disclosure.

4. The detection probe designed by the present disclosure uses an orthogonal excitation mode, which can improve and stabilize the excitation signal and obtain effective and stable magnetic signals, thus making the detection result more accurate.

5. The detection probe designed by the present disclosure is precisely provided with the concave part in which the magnetoresistive sensor is placed, which can keep the magnetoresistive sensor stable when detecting the magnetic signal and make the detection result more accurate.

6. The electronic system module designed by the present disclosure is a signal processing device and a data acquisition device, which can better acquire and analyze stress concentration signals and make the detection effect more accurate.

7. The present disclosure uses a TMR2503 linear sensor, which has high detection sensitivity.

8. The present disclosure has low requirements on working environment, and can obtain more stable and effective magnetic signals, and the operation is simple and convenient.

In several embodiments provided by the present disclosure, it should be understood that the disclosed device and method can be realized in other ways. For example, the device embodiment described above is only schematic. For example, the division of units is only a logical function division. In actual implementation, there may be other division methods. For example, multiple units or components can be combined or integrated into another system, or some features can be ignored or not implemented.

The units described as separate components may or may not be physically separated. The components displayed as units may or may not be physical units, that is, they may be located in one place or distributed on multiple network units. Some or all of the units can be selected according to actual needs to achieve the purpose of the embodiment of the present disclosure.

In addition, each functional unit in each embodiment of the present disclosure may be integrated into one processing unit, or each unit may exist physically alone, or two or more units may be integrated into one unit. The above integrated units can be realized in the form of hardware or software functional units.

Integrated units can be stored in a computer-readable storage medium if they are implemented in the form of software functional units and sold or used as independent products. Based on this understanding, the essence of the technical scheme of the present disclosure or the part that contributes to the prior art, or all or part of the technical scheme can be embodied in the form of a software product. The computer software product is stored in a storage medium and comprises several instructions to make an electronic device (which can be a personal computer, a server, a network device, etc.) execute all or part of the steps of various embodiment methods of the present disclosure. The aforementioned storage media include: a USB flash disk, a mobile hard disk, a Read-Only Memory (ROM), a Random Access Memory (RAM), a magnetic disk or an optical disk and other media that can store program codes.

Although the embodiments disclosed in the present disclosure are as above, the contents described are only the embodiments used for the convenience of understanding the present disclosure, and are not used to limit the present disclosure. Those skilled in the technical field to which the present disclosure belongs may make any modification and change in the forms and details of implementation without departing from the spirit and scope of the present disclosure, but the scope of protection of the present disclosure shall still be subject to the scope defined in the appended claims.

What is claimed is:

1. An internal detection system of stress concentration of an oil and gas pipeline based on unsaturated orthogonal magnetization, comprising:

a detection device and a processing device; wherein the detection device comprises a detection probe;

the detection probe comprises a magnetizing device and a magnetic signal acquisition device;

the magnetizing device is fixedly connected with the magnetic signal acquisition device;

the magnetizing device is configured to magnetize a pipeline to be detected, so that the pipeline generates a magnetized magnetic field;

the magnetic signal acquisition device is configured to acquire a magnetic signal of the magnetized magnetic field to obtain an acquired signal and send the acquired signal to the processing device; and the processing device is configured to receive the acquired signal and obtain a stress concentration area of the pipeline based on the acquired signal, wherein the magnetizing device comprises an excitation coil and two U-shaped magnetic cores fixed orthogonally to each other;

the excitation coil is uniformly wound on each of the magnetic cores;

end faces of core legs of the two magnetic cores are located on a same plane, the core legs of the two magnetic cores are arranged in a ring to form a concave part; and the magnetic signal acquisition device is fixedly provided at the concave part, and wherein the magnetic signal acquisition device is a magnetoresistive sensor;

the magnetoresistive sensor comprises a detection chip for acquiring the magnetic signal; and the detection chip is flush with the end faces of the core legs of the two magnetic cores and is closely attached to an inner wall of the pipeline.

2. The internal detection system according to claim 1, wherein magnetization of the pipeline which is carried out by the magnetizing device is unsaturated magnetization; and an absolute value of a difference between an intensity of unsaturated magnetization of the pipeline upon being magnetized by the magnetizing device and an intensity of saturated magnetization of the pipeline is less than a predetermined threshold.

3. The internal detection system according to claim 1, wherein the detection probe further comprises: a shell matched with the core legs of the two magnetic cores; and the core legs of the two magnetic cores are fixedly provided in the shell.

4. The internal detection system according to claim 1, wherein there are a plurality of detection probes; the detection device further comprises a cylindrical probe carrier;

the plurality of detection probes are fixedly provided on an outer surface of the probe carrier in an annular array arrangement mode;

when the detection device is placed in the pipeline, an end face of each detection probe with the detection chip is closely attached to an inner wall of the pipeline.

5. The internal detection system according to claim 4, wherein the detection device further comprises backing plates with a same number as the detection probes; the backing plates are fixedly provided on an outer surface of the probe carrier in an annular array arrangement mode; and each detection probe is fixedly provided on a backing plate corresponding to a detection probe through a spring.

6. The internal detection system according to claim 5, wherein the detection device further comprises a wheel and axle system; and the wheel and axle system is configured to drive the probe carrier to move axially in the pipeline.

7. The internal detection system according to claim 1, wherein the processing device comprises a signal preprocessing module, a data operation module and a storage module; the signal preprocessing module, the data operation module and the storage module are electrically connected in sequence; the signal preprocessing module is configured to filter and amplify the acquired signal to obtain a preprocessed signal; the data operation module is configured to calculate the stress concentration area of the pipeline based on the preprocessed signal; and the storage module is configured to store the stress concentration area of the pipeline as a processing result.

8. The internal detection system according to claim 1, wherein the system further comprises a preset terminal; and the processing device is further configured to obtain a stress magnitude of the stress concentration area of the pipeline based on the acquired signal, and send the stress concentration area and the stress magnitude to the preset terminal as a processing result.

9. The internal detection system according to claim 1, further comprising a spring attached to the detection probe to closely attach the detection chip to the inner wall of the pipeline.

* * * * *